United States Patent
Busson et al.

(10) Patent No.: US 11,217,794 B2
(45) Date of Patent: Jan. 4, 2022

(54) CATHODE OF ACCUMULATOR, ASSOCIATED ACCUMULATOR AND BATTERY

(71) Applicants: ARMOR, Nantes (FR); Centre national de la recherche scientifique, Paris (FR); UNIVERSITE DE NANTES, Nantes (FR)

(72) Inventors: Christophe Maria Busson, Reze (FR); Bernard Lestriez, Nantes (FR); Pierre Guichard, Reze (FR); Marie-Anne Blin, Orvault (FR)

(73) Assignees: ARMOR, Nantes (FR); Centre national de la recherche scientifique, Paris (FR); UNIVERSITE DE NANTES, Nantes (FR)

( * ) Notice: Subject to any disclaimer, the term of this patent is extended or adjusted under 35 U.S.C. 154(b) by 113 days.

(21) Appl. No.: 16/068,352

(22) PCT Filed: May 30, 2017

(86) PCT No.: PCT/FR2017/051351
§ 371 (c)(1),
(2) Date: Jul. 5, 2018

(87) PCT Pub. No.: WO2018/220285
PCT Pub. Date: Dec. 6, 2018

(65) Prior Publication Data
US 2019/0131629 A1    May 2, 2019

(51) Int. Cl.
*H01M 4/66* (2006.01)
*H01M 4/04* (2006.01)
(Continued)

(52) U.S. Cl.
CPC ........ *H01M 4/667* (2013.01); *H01M 4/0404* (2013.01); *H01M 4/13* (2013.01);
(Continued)

(58) Field of Classification Search
CPC ............ H01M 4/66; H01M 4/62; H01M 4/13; H01M 10/0525
See application file for complete search history.

(56) References Cited

U.S. PATENT DOCUMENTS 5,478,676 A     12/1995  Turi et al.
10,367,205 B2    7/2019  Kim et al.
(Continued)

FOREIGN PATENT DOCUMENTS

CN     101471435 A     7/2009
FR     3005207 A1     10/2014
(Continued)

OTHER PUBLICATIONS

International Search Report issued by the International Searching Authority in International Application No. PCT/FR2017/051351, dated Dec. 18, 2017, 4 pages total.
(Continued)

*Primary Examiner* — Kenneth J Douyette
(74) *Attorney, Agent, or Firm* — Troutman Pepper Hamilton Sanders LLP (57) ABSTRACT

The present invention relates to composite material comprising a matrix and a metallic layer located at at least one surface of said composite material, said matrix comprising at least one polymer and a first population of particles of at least one electronically conducting metal, said layer comprising a second population of particles of at least one electronically conducting metal, a method for preparing such composite material and applications thereof.

11 Claims, 7 Drawing Sheets

(51) Int. Cl.
  *H01M 4/131* (2010.01)
  *H01M 4/62* (2006.01)
  *H01M 4/13* (2010.01)
  *H01M 10/0525* (2010.01)
  *H01M 4/02* (2006.01)

(52) U.S. Cl.
  CPC ............ *H01M 4/131* (2013.01); *H01M 4/622* (2013.01); *H01M 4/625* (2013.01); *H01M 4/661* (2013.01); *H01M 10/0525* (2013.01); *H01M 2004/028* (2013.01)

(56) References Cited

U.S. PATENT DOCUMENTS

| | | | |
|---|---|---|---|
| 2004/0062986 A1* | 4/2004 | Aamodt | H01M 2/0257 429/181 |
| 2012/0088156 A1 | 4/2012 | Nomoto et al. | |
| 2013/0157143 A1* | 6/2013 | Hoshiba | H01M 10/02 429/304 |
| 2013/0209889 A1 | 8/2013 | Koji | |
| 2014/0322600 A1 | 10/2014 | Masahiro | |
| 2015/0024282 A1* | 1/2015 | Lee | H01M 10/0567 429/332 |
| 2015/0228973 A1* | 8/2015 | Won | H01M 4/366 429/220 |
| 2016/0093922 A1 | 3/2016 | Kazuki | |
| 2016/0254545 A1 | 9/2016 | Yasunari | |

FOREIGN PATENT DOCUMENTS

| | | |
|---|---|---|
| JP | 4-34871 U | 3/1992 |
| JP | 11-312516 A | 11/1999 |
| JP | 2003-68364 A | 3/2003 |
| JP | 2012-99467 A | 5/2012 |
| JP | 2015-103394 A | 6/2015 |
| JP | 2016-72221 A | 5/2016 |
| JP | 2016-164868 A | 9/2016 |
| KR | 10-2013-0005440 A | 1/2013 |
| WO | 2012053087 A1 | 4/2012 |
| WO | 2013073012 A1 | 5/2013 |

OTHER PUBLICATIONS

Zhao, Qing et al., "Advanced Organic Electrode Materials for Rechargeable Sodium-Ion Batteries", Adv. Energy Materials (2017), 22 pages.

The rise of organic electrode materials for energy storage—asked client for document.

Notice of Reasons for Rejection issued in Japanese Patent Application No. 2018-537768 dated Sep. 27, 2021, with English translation.

Notice of Reasons for Rejection issued in Korean Patent Application No. 10-2018-7021362 dated Oct. 27, 2021, with partial English translation.

* cited by examiner

CATHODE OF ACCUMULATOR, ASSOCIATED ACCUMULATOR AND BATTERY

CROSS-REFERENCE TO RELATED APPLICATIONS

This is a U.S. national phase application under 35 U.S.C. § 371 of International Patent Application No. PCT/FR2017/051351, filed May 30, 2017. The entire contents of these applications are hereby incorporated by reference.

TECHNICAL FIELD OF THE INVENTION

The present invention relates to a cathode. The invention also relates to an electrochemical accumulator and to a battery comprising such a cathode.

BACKGROUND

An electrochemical accumulator typically comprises at least four elements: a positive electrode, a negative electrode, an electrolyte, as well as current collectors for each electrode. The assembly of a negative electrode and a current collector form an anode, while the assembly of a positive electrode and a current collector form a cathode.

The operating principle of these accumulators is based on the reversible storage of electrical energy in chemical energy by the implementation of two separate and coupled electrochemical reactions. The positive and negative electrodes are immersed in the electrolyte which are the locus of electrochemical reactions, that are referred to as faradic. The electrodes are, in particular, made of active materials for charging and discharging the ions via oxidation and reduction reactions.

During the discharging, the active material at the negative electrode is oxidized and releases, on the one hand, electrons that are routed through the current collector to the external circuit, and, on the other hand, cations that migrate to the positive electrode through the electrolyte. Then, the electrons having passed through the circuit that used the energy, and the cations, are captured by the active material at the positive electrode that is reduced. The energy density that an accumulator can release is a function of both the potential and the capacity of the electrochemical cell, wherein both are directly related to the chemistry of the system. The potential of a battery is determined by the difference between the potentials of the oxidation-reduction reactions occurring simultaneously at the positive and negative electrodes.

The electrodes are made according to a composition, wherein the composition mainly comprises one or more active material(s) (>90% by weight) of conductive particles ensuring good transport of electrons towards all the active materials, and a binder which makes it possible to ensure the cohesion of the particles, as well as adhesion to the substrate.

The whole is manufactured, in general, as a formulation with the aid of a solvent that will allow coating of the electrode.

Then the two electrodes, positive and negative, are connected ionically by an electrolyte. This may be in liquid, gel or solid form.

Due to the intrinsic migration behavior of the accumulator ions, their electrodes need materials capable of charging and/or discharging the ions. Many developments have thus been implemented to optimize these electrodes and obtain a higher specific energy density and higher specific power.

The selection criteria are mainly focused on the available capacity and the operating potential—and therefore the available energy—but also on the power or the safety and the cost of the materials.

The mass energy or specific energy is defined as the ratio between the energy that may be restituted at a given rate (discharge rate at which the accumulator is discharged) and the mass of the accumulator. The specific energy is expressed in Wh/kg.

This concept is particularly useful for the dimensioning of a battery in embedded systems where mass is a predominant dimensioning criterion.

The energy density is the ratio between the energy that may be restituted at a given rate and the volume of the accumulator. The energy density is expressed in Wh/L. This concept is useful for sizing a stationary battery because, in these applications, volume is often a more important criterion than mass.

Lithium technologies have the best characteristics in terms of mass and volume energy densities. These technologies are therefore preferentially chosen for nomadic applications, such as mobile telephony or laptops. On the other hand, because of the high cost of this type of accumulator, the other storage technologies still find many applications. Lead-acid batteries are often preferred for stationary applications (e.g. storage of renewable energies), or for starting vehicles. As for nickel-cadmium (Ni—Cd) or nickel-metal hydride (Ni-MH) batteries, these are still mainly used in portable power tools or in hybrid electric vehicles because of their low cost and their reliability.

For many applications, it is therefore desirable to improve the electrical mobility and storage of renewable energy by increasing the performance in terms of mass and volume energy densities.

To this end, studies have been carried out to optimize various parameters among which are the electrolytes of the batteries or the active materials used for the electrodes.

But, none of these studies has led to satisfactory results to date.

SUMMARY

There is, therefore, a need for an electrode for an electrochemical accumulator making it possible to obtain an accumulator having a specific energy density and an even higher specific power.

For this purpose, the present description relates to an electrochemical accumulator cathode comprising an electrode, a current collector, an interface layer, wherein the interface layer is coated on the current collector, and wherein the interface layer is also in contact with the electrode and has a thickness of less than 5 μm.

According to particular embodiments, the cathode comprises one or more of the following characteristics, taken separately or in any technically feasible combination:
  the electrode comprises a first composition comprising a first intercalation material, a first binder material and a first conductive additive, wherein the content of the first conductive additive is less than or equal to 2% by weight, preferably less than or equal to 1% by weight.
  the electrode comprises a first composition comprising a first intercalation material and a first binder material.
  the first binder material consists of one or more polymers.
  the interface layer has a thickness greater than or equal to 10 nm.
  the interface layer has a thickness of between 50 nm and 1 μm.

the collector is a metal sheet.

the interface layer comprises a second composition comprising a second binder material and a second conductive additive.

the second binder material consists of one or more polymers.

the content of the second binder material is greater than or equal to 30% by weight of the interface layer.

the content of the second conductive additive is greater than or equal to 10% by weight of the interface layer.

The present description also relates to an electrochemical accumulator comprising a cathode as previously described.

According to one embodiment, the accumulator is a lithium-ion battery.

This description also describes a battery comprising a set of accumulators, wherein at least one accumulator is an accumulator as previously described.

BRIEF DESCRIPTION OF THE DRAWINGS

Other features and advantages of the invention will become apparent upon reading the following description of embodiments of the invention, given by way of example only and with reference to the drawings, wherein.

DETAILED DESCRIPTION

Figure 1:
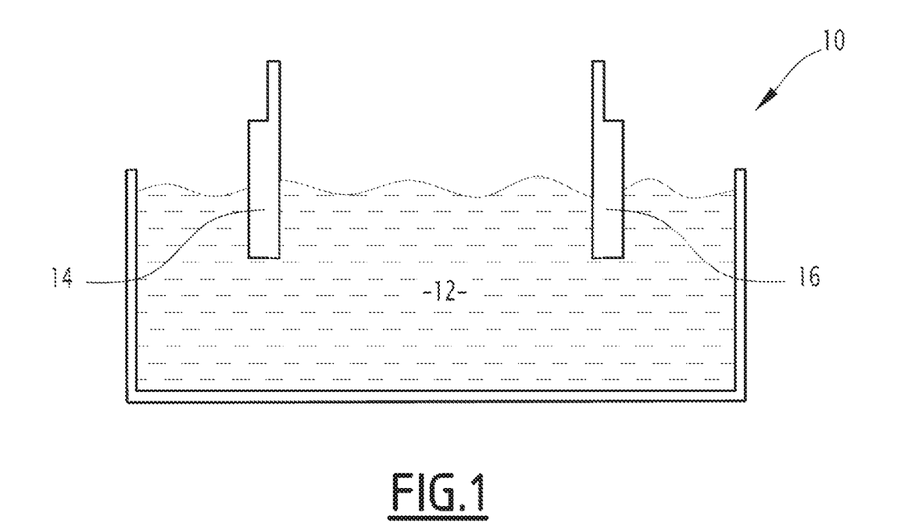
FIG. 1 shows a schematic representation of an accumulator of a battery having a cathode.

An electric accumulator 10 is shown in FIG. 1.

The accumulator 10 is intended to be connected to other electric accumulators to form an electrical voltage generator with the desired capacity. Such a generator is called a storage battery or simply a battery.

An accumulator 10 uses a reversible energy conversion technique to store energy and then to supply it later.

The described accumulator 10 uses an electrochemical reaction, i.e. the accumulator 10 is an electrochemical accumulator.

The accumulator 10 comprises an electrolyte 12, an anode 14 and a cathode 16.

In the example proposed, the accumulator 10 is a lithium-ion accumulator intended for a lithium-ion battery but the claimed elements may also be applicable to other electrochemical accumulator technologies comprising the same elements as accumulators of the following types: Lead-Acid, Nickel-Cadmium (NiCd), Nickel-Metal Hydride (NiMH), Nickel-Zinc (NiZn), Sodium-Sulfur (Na—S), Sodium-ion (Na-ion), Lithium Metal Polymer (LMP), Lithium-Polymer (Li—Po), Lithium-Sulfur (Li—S), Nickel-Lithium (Ni—Li).

The interaction between the electrolyte 12, the anode 14 and the cathode 16 allows the accumulator 10 to function as an electrochemical accumulator.

The electrolyte 12 is conventionally composed of different ionic salts providing ions for charge storage or faradic reactions, carbonates and a solvent or solvent mixture to allow the solubilization of ions.

In a lithium-ion accumulator, the ionic salts are conventionally LiPF6 (Lithium hexafluorophosphate), lithium bis (Trifluoromethane Sulfonyl) Imide salt (LiTFSI), LiBF4 (Lithium tetrafluoroborate) and LiBOB (lithium bis oxalate borate). LiDFOB (Lithium Difluoro-oxalatoborate). The carbonates are, for example, propylene carbonate (PC), ethylene carbonate (EC), dimethyl carbonate (DMC), methyl ethyl carbonate (EMC) or diethyl carbonate (DEC). It is also possible to find, in a smaller proportion, methyl acetate or methyl formate, acetonitrile, tetrahydrofuran or else gamma-butyrolactone, and binary or ternary or even quaternary mixtures of these, as well as ionic liquids.

The anode 14 is made of a material for intercalating ions, for example carbon in a lithium-ion battery, which is used mostly in the form of MesoCarbon MicroBeads (MCMB), graphites, whether they are artificial or natural or graphitic materials such as soft or hard carbon, or other types of negative electrode materials based on lithium titanate ($Li_4Ti_5O_{12}$ or LTO), silicon, tin or alloys.

Figure 2:
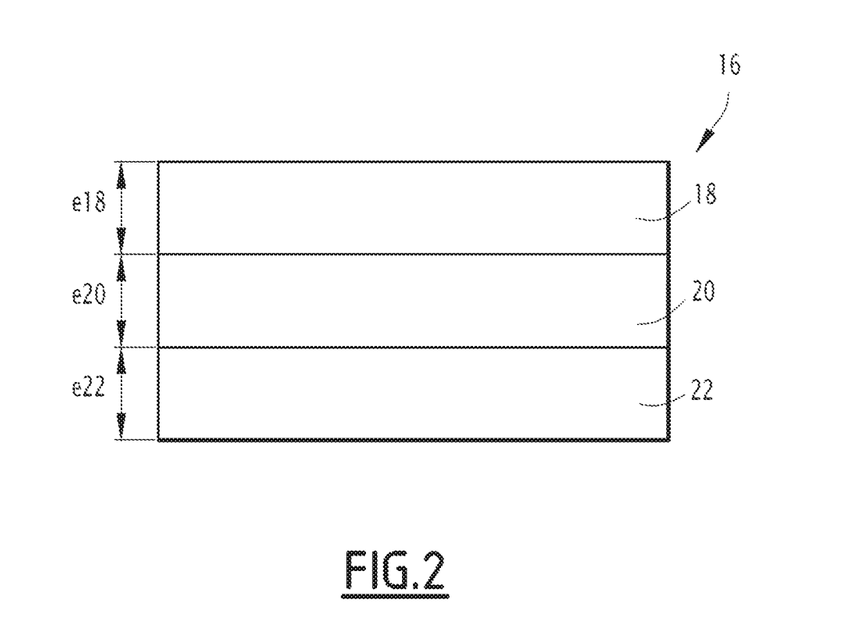
FIG. 2 shows a schematic representation of a side section of the cathode of the accumulator.

The cathode 16 is shown in more detail in FIG. 2.

The cathode 16 comprises an electrode 18, an interface layer 20 and a current collector 22.

The electrode 18, the current collector 22 and the interface layer 20 form a stack of layers in a stacking direction marked Z.

The electrode 18 is in contact with the electrolyte 12.

The electrode 18 comprises a first composition C1 whose properties will now be described.

The first composition C1 comprises a first intercalation material MI1, a first binding material ML1 and a first conductive additive AC1.

The intercalation material is also referred to as "active material".

In a lithium-ion battery, the active material of the electrode 18 is conventionally composed of lithiated metal oxide, for example $LiCoO_2$ (LCO), $LiNiMnCoO_2$ (NMC), $LiNiCoAlO_2$ (NCA), $LiMn_2O_4$(LMO), LiFePO4 (LFP), Li (LiNiMn)$O_2$ or LiNiMnO (LNMO); LiS. Other examples of active material of the electrode 18 are possible, for example for sodium-ion batteries, examples are listed in the publication "Advanced Organic Electrode Materials for Rechargeable Sodium-Ion Batteries. Zhao, Q., Lu, Y, & Chen, J. Advanced Energy Materials (2016).

The choice of the first ML1 binder material may vary considerably as long as the first binder material ML1 is inert relative to the other electrode materials. The first binder material ML1 is a material, usually polymeric, which facilitates the implementation of the electrodes during their manufacture. The first binder material ML1 comprises one or more polymers selected from thermoplastic polymers, thermosetting polymers, elastomers and mixtures thereof.

Examples of thermoplastic polymers include, without limitation, polymers derived from the polymerization of aliphatic or cycloaliphatic vinyl monomers, such as polyolefins (including polyethylenes or polypropylenes), polymers derived from the polymerization of vinyl aromatic monomers such as polystyrenes, polymers derived from the polymerization of acrylic monomers and/or (meth)acrylates, polyamides, polyetherketones, polyimides.

Examples of thermosetting polymers include, but are not limited to, thermosetting resins (such as epoxy resins, polyester resins) optionally mixed with polyurethanes or with polyether polyols or vice versa.

Examples of elastomeric polymers include, but are not limited to, natural rubbers, synthetic rubbers, styrene-butadiene copolymers (also known by the abbreviation SBR), ethylene-propylene copolymers (also known by the abbreviation EPM), silicones.

The first binder material ML1 may be a mixture of thermoplastic polymer(s), thermosetting polymer(s) and/or elastomeric polymer(s).

Other suitable first binder materials ML1 include crosslinked polymers, such as those made from polymers having carboxyl groups and crosslinking agents.

The content of the first binder material ML1 is less than 5% by weight.

In what follows, the weight content of an element of a composition is calculated relative to the weight of the total composition.

The first conductive additive AC1 comprises one or more types of conductive elements for improving the electronic conductivity.

Examples of conductive elements include, but are not limited to, conductive carbons, graphites, graphenes, carbon nanotubes, activated carbon fibers, unactivated carbon nanofibers, metal flakes, metal powders, metal fibers and electrically conductive polymers.

The content of first conductive additive AC1 is less than or equal to 4% by weight.

By way of example, the thickness e18 of the electrode 18 is 50 μm.

The current collector 22 is made of a material that is sufficiently conductive in order to provide electronic transport that is light, thin, and mechanically resistant in order to serve as a substrate for the electrode 18.

For example, the current collector 22 is a metal sheet made of iron, copper, aluminum, nickel, titanium or stainless steel.

In another example, the material of the current collector 22 is carbon paper, or a plastic film (such as polyethylene terephthalate, PET) coated with graphene or metal particles.

By way of example, the thickness e22 of the current collector 22 is 20 μm.

The interface layer 20 provides an interface between the current collector 22 and the electrode 18.

This means, in particular, that the interface layer 20 is a layer in contact, on the one hand, with the current collector 22 and, on the other hand, with the electrode 18.

The interface layer 20 is coated on the current collector 22.

The interface layer 20 has a thickness e20 of less than 5 μm.

Preferably, the interface layer 20 has a thickness e20 greater than or equal to 10 nm.

Advantageously, the interface layer 20 has a thickness e20 of between 50 nm and 1 μm.

The interface layer 20 is made according to a second composition C2.

The second composition C2 comprises a second binder material ML2 and a second conductive additive AC2.

The choice of the second binder material ML2 may vary considerably as long as the second binder material ML2 is inert with respect to the other materials of the second composition C2. The second binder material ML2 comprises one or more polymers selected from thermoplastic polymers, thermosetting polymers, elastomers and mixtures thereof.

Examples of thermoplastic polymers include, without limitation, polymers derived from the polymerization of aliphatic or cycloaliphatic vinyl monomers, such as polyolefins (including polyethylenes or polypropylenes), polymers derived from the polymerization of vinyl aromatic monomers such as polystyrenes, polymers derived from the polymerization of acrylic monomers and/or (meth) acrylates, polyamides, polyetherketones, polyimides, polyvinyl alcohols, fluorinated polymers, polyacrylonitrile.

Examples of thermosetting polymers include, but are not limited to, thermosetting resins (such as epoxy resins, polyester resins) optionally in admixture with polyurethanes or with polyether polyols or vice versa.

Examples of elastomeric polymers include, but are not limited to, natural rubbers, synthetic rubbers, styrene-butadiene copolymers (also known by the abbreviation SBR), ethylene-propylene copolymers (also known by the abbreviation EPM), silicones.

The second binder material ML2 may be a mixture of thermoplastic polymer(s), thermosetting polymer(s) and/or elastomeric polymer(s).

Other suitable second binder materials ML2 include crosslinked polymers, such as those made from polymers having carboxyl groups and crosslinking agents.

The content of the second binding material ML2 is greater than or equal to 30% by weight.

Preferably, the content of the second binder material ML2 is less than or equal to 80% by weight.

Advantageously, the content of the second binder material ML2 is between 40% by weight and 70% by weight.

The second conductive additive AC2 comprises one or more types of conductive elements for improving the electronic conductivity.

Examples of conductive elements include, but are not limited to, conductive carbons, graphites, graphenes, carbon nanotubes, activated carbon fibers, unactivated carbon nanofibers, metal flakes, metal powders, metal fibers and electrically conductive polymers.

The content of the second conductive additive AC2 is greater than or equal to 20% by weight.

Preferably, the content of the second conductive additive AC2 is less than or equal to 70% by weight.

Advantageously, the content of the second conductive additive AC2 is between 30% by weight and 60% by weight.

The operation of the accumulator 10 is in accordance with the operation of an electrochemical accumulator of the prior art.

It should be noted that the interface layer 20 improves the current collector/electrode interface by optimizing the adhesion and the contact resistance. The contact resistance has a major effect on the electronic conductivity of the assembly, wherein a strong resistance acts as a barrier to electron transfer during the cycling. In this case the interface layer 20 may help reduce this phenomenon by improving the conduction path.

The other function of the interface layer 20 is to allow protection of the current collector 22, as the corrosion of current collectors is a fairly widespread phenomenon. For good corrosion resistance, it is therefore necessary to cut access of the electrolyte to the current collector. The interface layer 20 therefore acts as a physical barrier to the access of the ions responsible for the corrosion, but will also act on the stabilization of the potential of the current collector interface/interface layer.

Compared to an accumulator of the prior art, the performance is improved as shown in the experimental section.

Figure 13:
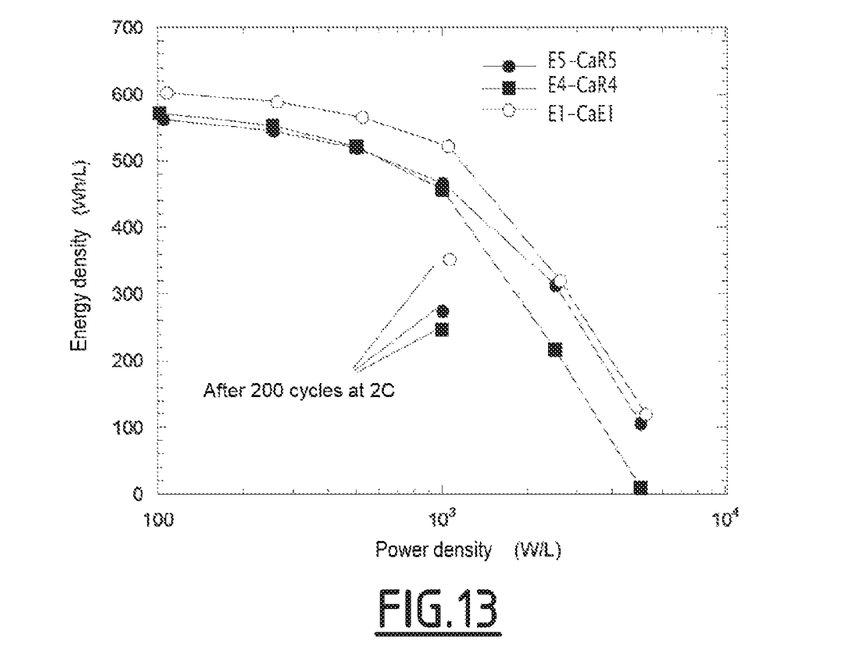

Despite the low content of conductive additives in the formulation of the electrode 18 of the cathode 16, the accumulator 10 has a specific capacity that is retained in comparison with the cathodes of the prior art whose content of conductive additives is greater than 2%. The results of FIG. 13 show that an improvement in energy density (mass energy or volume energy) is possible with a cathode as claimed.

In addition, the retention of the capacity after 500 cycles is about 50% for a cathode according to the prior art and 60% for a cathode 16 with a zero content of conductive additive. This corresponds to a gain of 20% in terms of capacity retention. The use of such a cathode 16 in an accumulator 10 makes it possible to improve the cyclability and the life of the accumulators.

Finally, the use of a cathode 16 in an accumulator allows its use at high operating rates allowing association of the gain in energy density with improved available power.

Alternatively, the content of first conductive additive AC1 may be less than or equal to 2% by weight.

Preferably, the content of first conductive additive AC1 is less than or equal to 1% by weight.

According to another embodiment, the first composition C1 consists of an intercalation material and a binder material. The first composition C1 is thus free of conductive additives.

Experimental Section

Experimental Protocol
Materials

In this study, an aluminum sheet (1085 series, 20 µm thick) was used as a current collector.

A carbon-based formulation (70% by weight of thermoplastic polymer and 30% by weight of carbon black) that is intended to form the interface layer, is deposited as a coating in the form of a thin layer on the same sheet of aluminum paper. The thickness of the coating after drying of the coating is between 1 µm and 1.5 µm.

The positive electrode is made from an active material, lithium iron phosphate ($LiFePO_4$-LFP) (Pholicat Fe100, Umicore), carbon black (C65, Timcal) and from a polymeric binder, poly (vinylidene fluoride)-PVdF (Solef 5130, Solvay). The dry weight ratio was adapted for each variation in carbon content in order to obtain a similar ratio between the mass of PVdF and the specific mass of C65 (62 $m^2 \cdot g^{-1}$) and LFP (20.9 $m^2 \cdot g^{-1}$) in order to obtain the same mechanical properties for the composite electrodes. The various ratios by weight of LFP/PVdF/C65 are shown in Table 1.

TABLE 1

Dry weight ratios of the composite positive electrode

| Electrode denomination | LFP (% in weight) | PVdF (% in weight) | C65 (% in weight) | Electrode conductivity ($S \cdot m^{-1}$) |
|---|---|---|---|---|
| First electrode E1 | 95.5 | 4.5 | 0 | 0.03 |
| Second electrode E2 | 94.4 | 4.6 | 1 | 0.07 |
| Third electrode E3 | 93.3 | 4.7 | 2 | 0.70 |
| Fourth electrode E4 | 92.2 | 4.8 | 3 | 2.5 |
| Fifth electrode E5 | 90 | 5 | 5 | 12.1 |

The various suspensions were prepared under the same conditions.

First of all, N-methyl-2-pyrrolidone (M-Pyrol, Ashland) was used to dissolve PVdF for 2 hours at 60° C. with magnetic stirring. In order to correctly disperse the carbon black, it was thoroughly mixed for 1 hour by mechanical stirring with the PVdF solution. Finally, the LFP powder was added and an agitation machine (IKA) was used for 75 min at room temperature. The dry content was set at 40% regardless of the formulation of the electrode: thus the rheological properties were not optimized.

The various mixed suspensions were coated using an automatic film applicator (AAF) from Elcometer: on the bare aluminum sheet, on the one hand, to form the cathode examples (denoted CaR1, CaR2, CaR3, CaR4, CaR5, hereinafter); on the aluminum sheet previously coated with an interface layer, on the other hand, to form the cathode examples (denoted CaE1, CaE2, CaE3, CaE4, CaE5 hereinafter).

The various coated suspensions were dried at 80° C. to 130° C. in air for 1 hour and held for 1 hour at 130° C. under vacuum. The typical loading of the active material was 10-11 $mg \cdot cm^{-2}$. The electrodes were calendered to a porosity of 38±2% irrespective of their composition.

On the negative side, a graphite electrode from Mti corp. was used without modification. The electrode comprises 95.7% by weight of MesoCarbon MicroBeads (MCMB) and a mixture of carboxymethylcellulose (CMC) and styrene-butadiene (SBR) as binder. The composite negative electrode with a thickness of 40 µm and a loading of active material of 6 $mg/cm^2$ is supported by a 9 µm thick copper current collector. The specific capacity claimed is 330 $mAh \cdot g^{-1}$.

Manufacture of Complete Cells

The accumulators were assembled in a glove box under an argon atmosphere. Two 0.5 mm stainless steel spacers and a wave spring were used to ensure good pressure on the electrodes. The positive electrode was cut into 1.27 $cm^2$ samples and dried at 90° C. for 1 hour under vacuum prior to assembly. The negative electrode was cut as a 1.13 $cm^2$ sample, in order to respect a capacity ratio between the positive and the negative sides at a typical value of about 20% in favor of the negative side. These samples were treated for 5 hours at 150° C. under vacuum before assembly. The electrolyte used was a 1M solution of $LiPF_6$ in ethylene carbonate: dimethyl carbonate (1:1 by volume, Solvionic), quenched in a fiberglass separator (Whatman). The accumulators finally reach a theoretical capacity of 1.8 $mAh \cdot cm^{-2}$.

Characterization

The electrochemical performances of the cells were characterized by a VMP3 multipotentiostat (Biologic).

First of all, six formation cycles between 4.3 V and 2.2 V vs $Li+/Li°$ at the C/5 speed (calculated on the theoretical capacity) were carried out in order to form the solid electrolyte interphase (SEI) layer on the graphite electrode and ensure that both electrodes were fully functional.

Then the cells were cycled at 50% state of charge (SOC) and allowed to stand for 1 hour to ensure a stable potential.

Then, a study of the discharge capability was performed by discharging the cells between C/5 and 10C, wherein the cell charge was set at C/5 between each discharge to ensure full charge. Finally, a galvanostatic cycle at 2C was carried out for 500 cycles.

Results and Discussion

Figure 3:
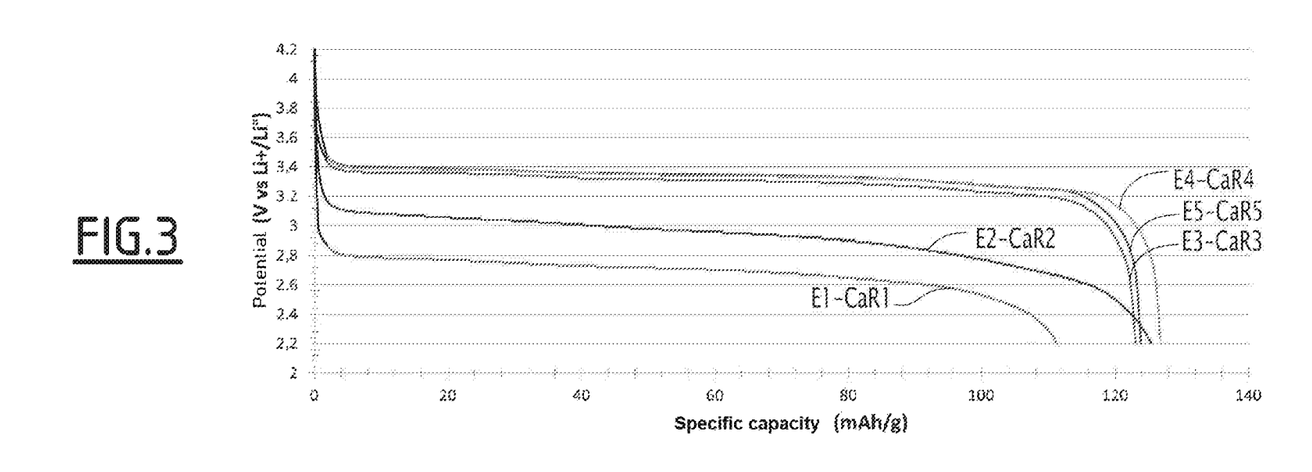
FIG. 3 to 13 show the results of experiments conducted by the applicant.
Figure 4:
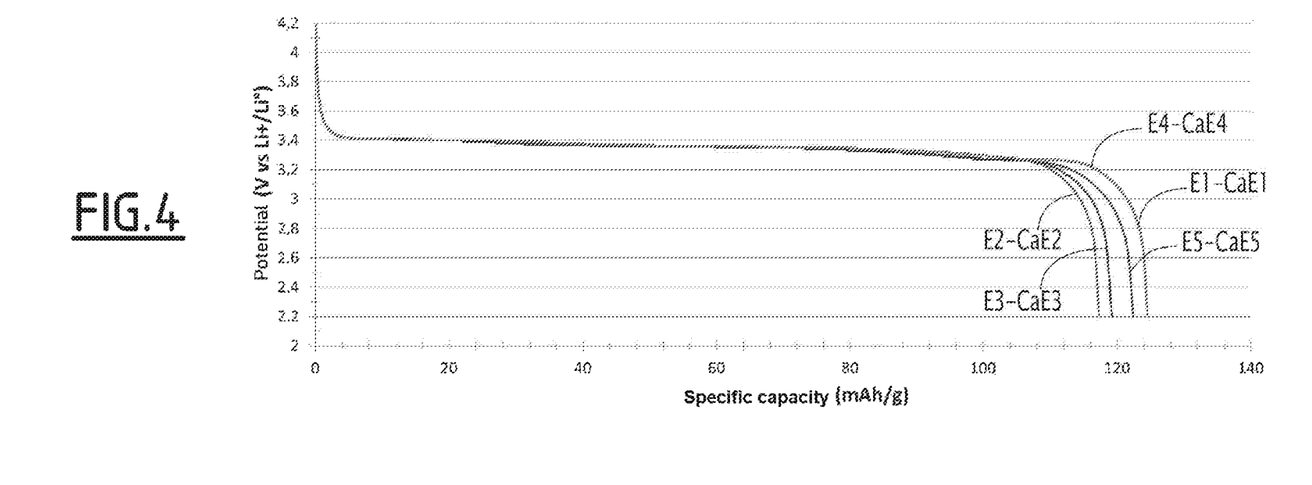
Figure 5:
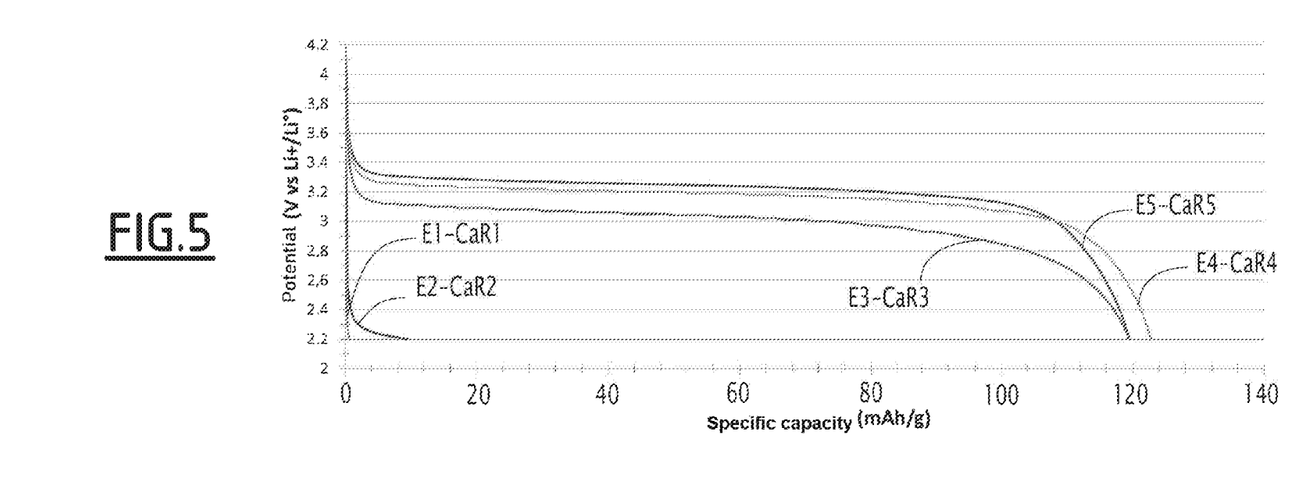
Figure 6:
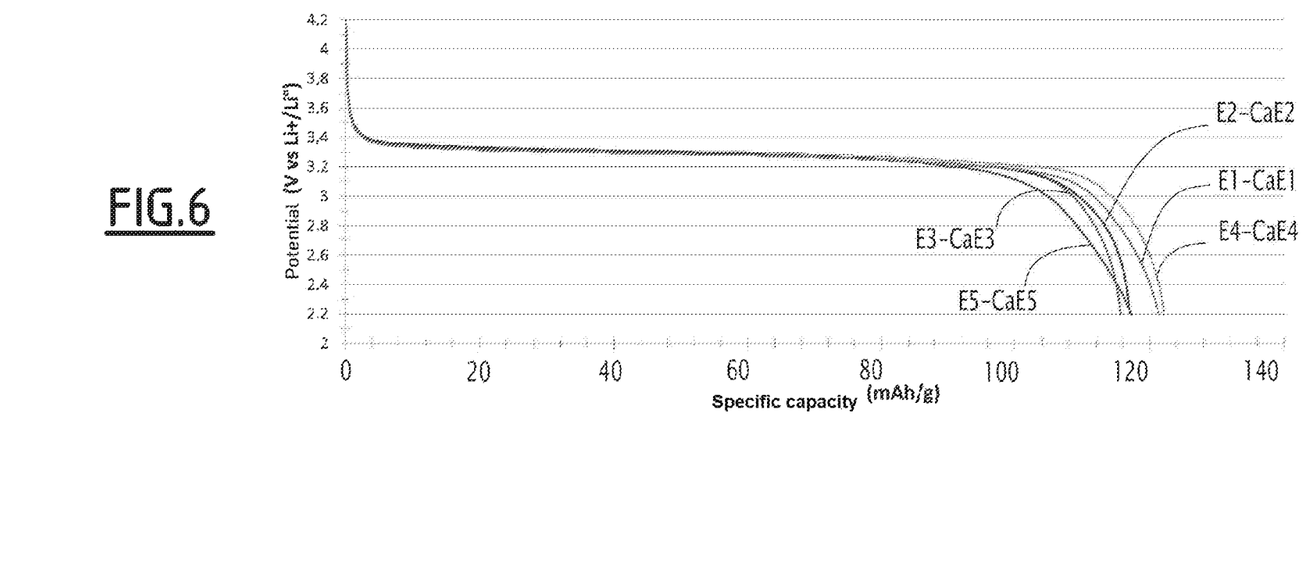
Figure 7:
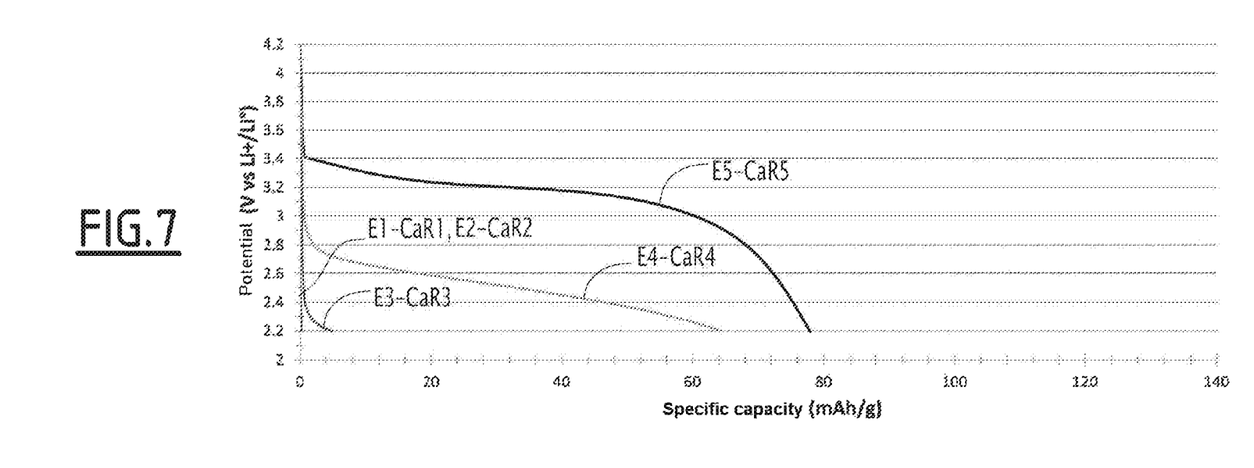
Figure 8:
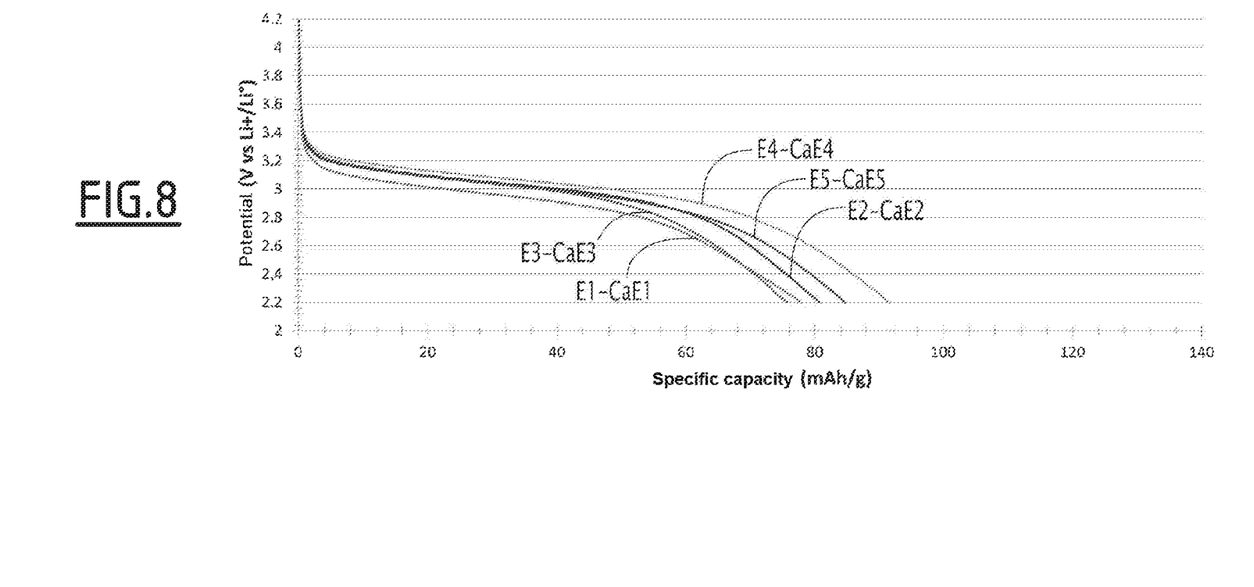
Figure 9:
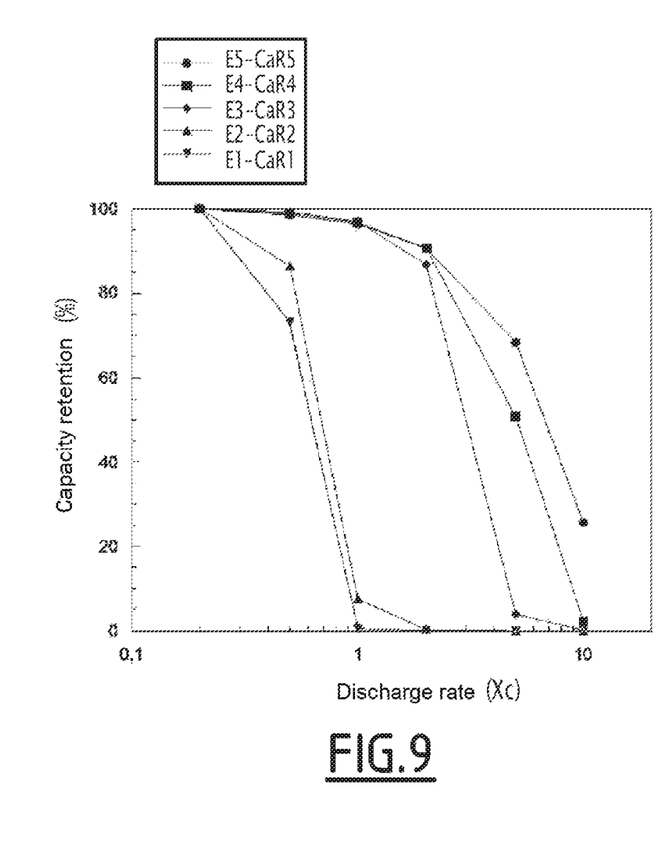
Figure 10:
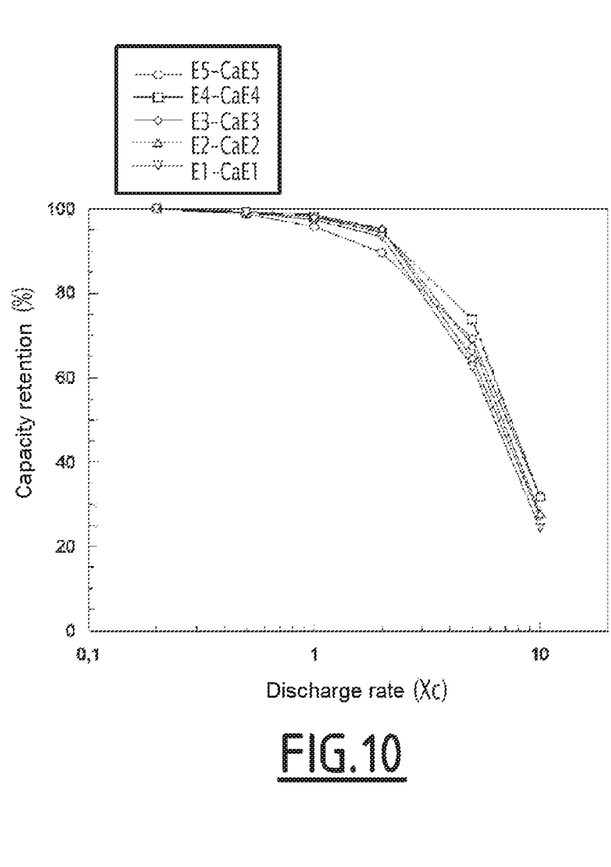

The results of the experiments carried out may be seen in FIG. 3 to 13 which respectively correspond to:
  FIG. 3 to 8, discharge curves for the various examples of electrodes at different rates or current. This rate is expressed as a fraction of the capacity of the battery.
  FIGS. 3 and 4 show the discharge curves at C/5, FIG. 3 for the $CaR_i$ cathode examples, FIG. 4 for the $CaE_i$ cathode examples; FIGS. 5 and 6 show the discharge curves at C, FIG. 5 for the $CaR_i$ cathode examples, FIG. 6 for the $CaE_i$ cathode examples; FIGS. 7 and 8 show the discharge curves at 5C, FIG. 7 for the $CaR_i$ cathode examples, and FIG. 8 for the $CaE_i$ cathode examples.
  FIGS. 9 and 10 show specific capacities available according to the operating conditions of the accumulators for the various examples of electrodes. FIG. 9 combines the observations for the $CaR_i$ cathode examples, while FIG. 10 shows the observations for the $CaE_i$ cathode examples.

Figure 11:
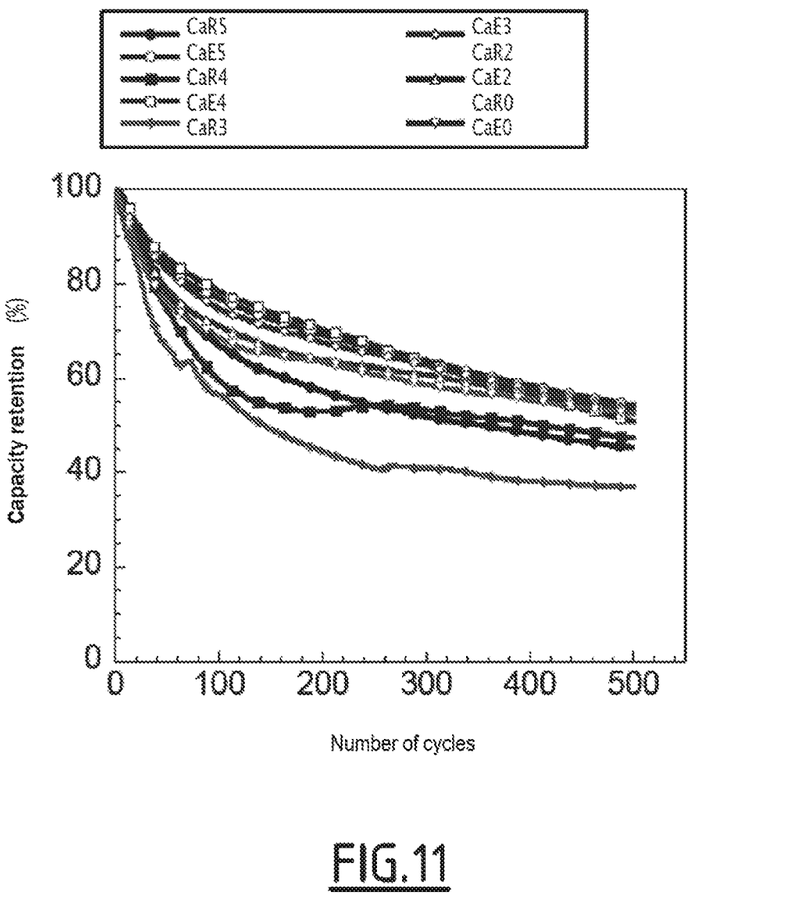

FIG. 11 shows the capacities retained as a function of the number of cycles of charges and discharges carried out by the accumulator for all the $CaR_i$ and $CaE_i$ cathode examples.

Figure 12:
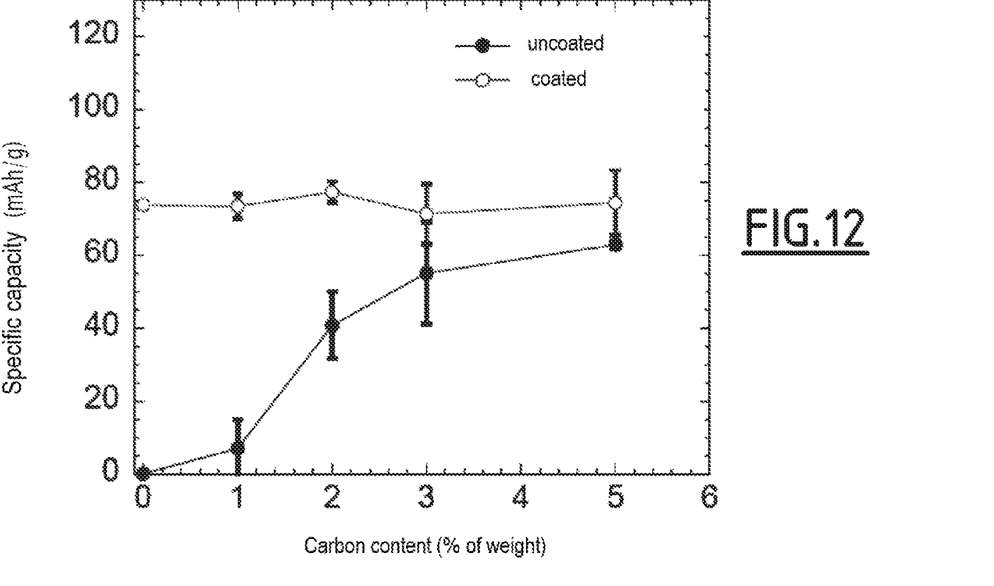

FIG. 12 shows specific capacities retained after 200 cycles of charges and discharges at 2C for all examples of the cathodes $CaR_i$ and $CaE_i$, as a function of the carbon content in the electrode.

FIG. 13 shows energy density versus power density comparing cathodes according to the prior art and the CaE0 cathode.

Electrical Performance of Cathodes

The electrochemical performances are presented in FIG. 3 to 13.

The analysis of the various figures shows that the electrochemical performances are maintained independently of the carbon content of the electrode 18 since the interface layer 20 is present within the cathode.

Increased Energy Density

FIG. 3 to 8 show the discharge voltage profiles at the C/5, C and 5C rates for all the electrodes tested.

If the carbon content of the electrodes (E3, E2, E1) is reduced, the operation of the accumulators comprising the cathode examples without an interface layer ($CaR_i$) is considerably affected in terms of voltage but also of specific capacity at all the rates.

At the same time, by reducing the carbon content of the cathode examples comprising an interface layer ($CaE_i$), the operation of the accumulators is not affected (or only very slightly), regardless of the composition of the electrode.

At a medium rate (C), the CaR0 and CaR1 cathodes have a specific capacity close to zero, whereas their equivalent electrodes CaE0 and CaE1 have a specific capacity of approximately 120 mAh/g.

At a high rate (5C), the polarization and the specific capacity remain substantially the same (approximately 80 mAh/g) for all electrode compositions with an CaE1 or CaE5 interface layer, whereas the accumulators comprising electrodes with a content of carbon below 2% without an interface layer (CaR1 and CaR2) no longer work as the polarization is too high to obtain a charge transfer.

Increased Power

The performance in terms of capacity retention as a function of the discharge regime is shown in FIGS. 9 and 10. For cathodes of the prior art, the rate of capacity retention decreases when the discharge rate is increased, wherein this tendency is accentuated by the decrease of the carbon content of the electrode: the carbon ensures the retention of a good capacity. This deterioration is visible as soon as the carbon content decreases to 3%, and becomes critical for carbon contents of 2 to 0% for which the capacity retention is close to 0 of the 1C rate.

In parallel, the performance in terms of capacity retention remains almost identical for all operating rates regardless of the carbon content of the electrodes according to the invention and, moreover, for electrodes without carbon.

This observation is all the more unexpected because a very low conductivity of the electrodes (Table 1) is observed in the case of low carbon content, while, despite this, the accumulators are still functional and display very good performance.

Increase of the Service Life (Number of Cycles of Charges and Discharges)

FIG. 11 shows the capacity retention as a function of the number of charge and discharge cycles under difficult conditions of 500 cycles at a 2C rate. For cathodes of the prior art, a reduction of the carbon content of the electrode decreases the cyclability, which becomes impossible below 2%. The cathodes $CaE_i$ as claimed exhibit a very different behavior, wherein the reduction of the carbon content of these electrodes improves the cycling of the accumulators. The cathode CaE1 (without carbon) shows a behavior similar to that of the cathode CaE5 of the accumulators over 500 cycles.

FIG. 12 shows the specific capacity retained after 200 cycles of charges and discharges at the 2C rate. For the cathodes of the prior art, the capacity retained is lower than that of the $CaE_i$ cathodes, while the reduction of the conductive carbon greatly reduces the capacity retained for the $CaR_i$ electrodes. The $CaE_i$ cathodes show similar behavior, regardless of the carbon content.

Increased Capacity Density and Power Density

FIG. 13, which represents the energy density as a function of the power density, shows that the accumulator comprising the CaE0 cathode retains these two quantities, energy and power, at a better level than any of the cathodes of the prior art. Finally, these remarkable properties are maintained even after 200 cycles (points indicated in FIG. 13) thus confirming the improvement of the performance in terms of the energy density and the life of accumulators comprising the cathode 16.

The invention claimed is:

1. A cathode of electrochemical accumulator comprising:
   an electrode,
   a current collector,
   an interface layer, the interface layer being coated on the current collector, and the interface layer being also in contact with the electrode and having a thickness of less than 5 micrometers,
   wherein the electrode is made in a first composition consisting of a first intercalation material and a first binder material,
   wherein the interface layer provides with an increase of retention of capacity of the electrochemical accumulator of at least 10%,
   wherein the interface layer comprises a second composition including a second binder material and a second conductive additive,
   wherein a content of the second binder material is greater than or equal to 30% by weight of the interface layer, and
   wherein a content of the first binder material is less than 5% by weight.

2. The cathode according to claim 1, wherein the first binder material consists in one or more polymers.

3. The cathode according to claim 1, wherein the interface layer has a thickness greater than or equal to 10 nanometers.

4. The cathode according to claim 1, wherein the interface layer has a thickness of between 50 nanometers and 1 micrometer.

5. The cathode according to claim 1, wherein the collector is a metal sheet.

6. The cathode according to claim 1, wherein the second binder material consists of one or more polymers.

7. The cathode according to claim 1, wherein a content of the second conductive additive is greater than or equal to 10% by weight of the interface layer.

8. An electrochemical accumulator, comprising:
   a cathode according to claim 1; and
   an electrolyte including a solvent or solvent mixture.

9. The electrochemical accumulator according to claim 8, wherein the accumulator is a lithium-ion accumulator.

10. A battery comprising a set of accumulators, wherein at least one accumulator is an electrochemical accumulator according to claim 8.

11. The cathode according to claim 1, wherein the interface layer provides with an increase of the retention of capacity of the electrochemical accumulator of at least 20%.

\* \* \* \* \*